July 17, 1934. R. W. MILLER 1,967,125
AUTOMATIC VOLUME CONTROL SYSTEM
Filed Sept. 27, 1933
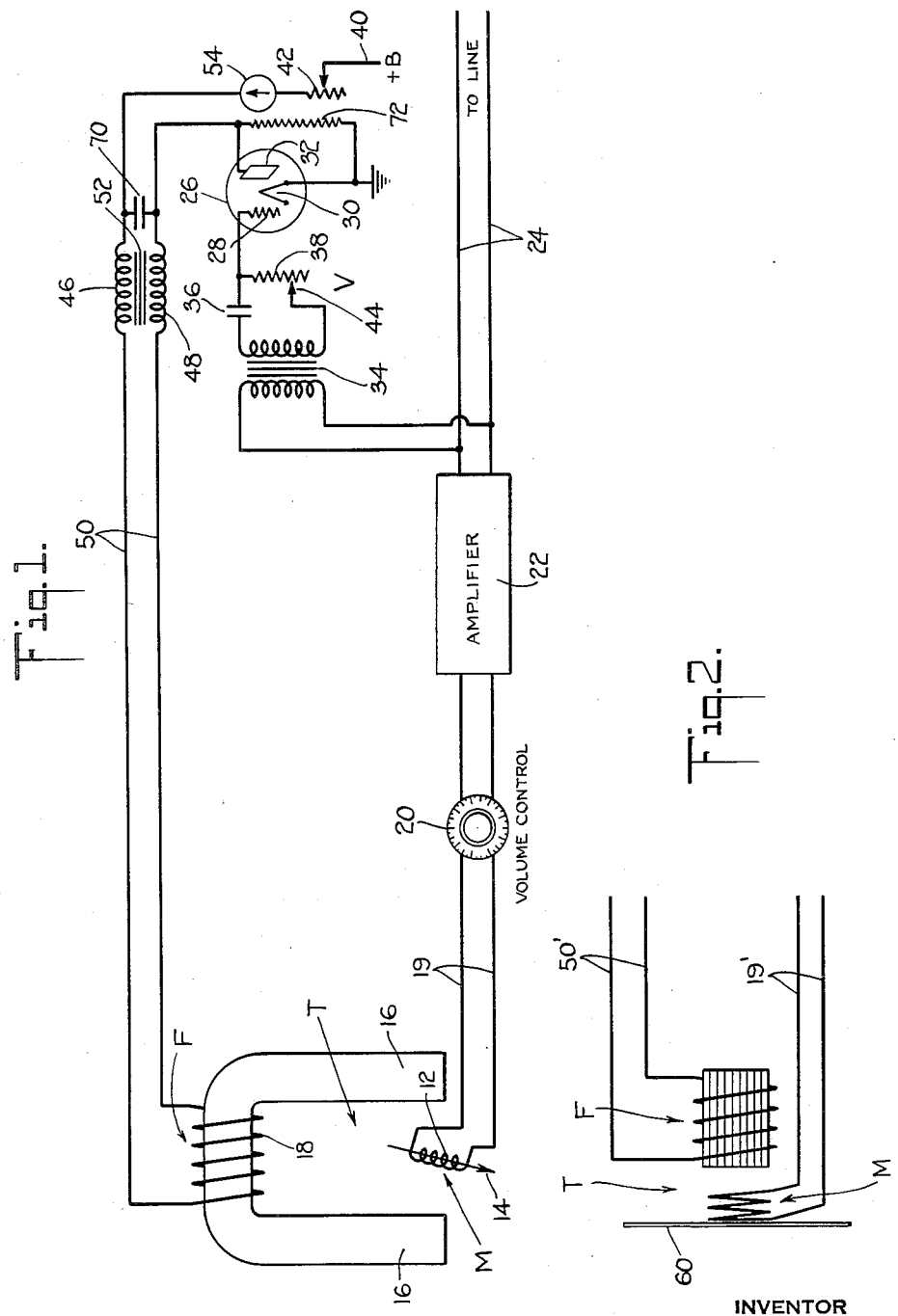
INVENTOR
Robert W. Miller
BY
ATTORNEYS Patented July 17, 1934

1,967,125

UNITED STATES PATENT OFFICE 1,967,125

AUTOMATIC VOLUME CONTROL SYSTEM

Robert W. Miller, New York, N. Y.

Application September 27, 1933, Serial No. 691,119

14 Claims. (Cl. 179—100.4)

This invention relates to automatic volume control systems and more particularly to a system for automatically monitoring or controlling the amplitude of an electrical wave relative to the amplitude of a mechanical vibration producing the same.

The primary object of my invention is to generally improve systems for translating mechanical vibrations into electrical oscillations, and is especially applicable to audio frequency or sound wave translating devices such as a phonograph pick-up or a microphone.

Considerable difficulty arises in monitoring or controlling the amplitude of electrical waves used for the transmission of sound. Manual monitoring requires constant alertness on the part of the operator, and even then it is practically impossible to follow sudden brief changes in amplitude. Even in the case of the reproduction of phonograph records it is highly desirable to have available some means for automatically monitoring the output of the phonograph because when used in restaurants or like establishments, sudden changes in amplitude are disconcerting and uncomfortable. To minimize this difficulty it has heretofore been necessary to use an attendant for manual monitoring and to select records characterized by an absence of abrupt brief changes in volume.

An important object of the present invention is to overcome the foregoing difficulties and to provide apparatus for automatically monitoring or controlling the amplitude of an electrical wave generated in response to mechanical vibrations; and a further object of my invention is to provide for the desired limitation of volume in a proportional or scaled manner and not by simple cut-off at a fixed level with resulting distortion.

Still further objects of my invention are to control the amplitude of the electrical wave as generated at the source; to make possible adjustment of the degree of control exercised by the apparatus; as well as to make possible control of the absolute volume or amplitude.

While volume controls involving a radio frequency carrier have been devised for radio receivers, no high frequency carrier is involved in the present invention. From this aspect, one object of my invention may be defined as the provision of an automatic volume control for audio frequency energy.

To the accomplishment of the foregoing, and such other objects as will hereinafter appear, my invention consists in the method steps and apparatus elements for volume control, and their relation one to the other as hereinafter are more particularly described in the specification and sought to be defined in the claims. The specification is accompanied by a drawing, in which:

Fig. 1 is a schematic wiring diagram showing my invention applied to a phonograph pick-up; and Fig. 2 is a modification showing the application of the invention to an electro-dynamic microphone.

Referring to the drawing, the apparatus of my invention comprises a translating device T including a field coil F and a movable coil M responsive to the mechanical vibrations for generating the desired electrical wave. The field coil F is energized from a source of direct current not shown in the drawing but connected to the vacuum tube circuit in conventional manner at +B. The apparatus further includes means generally designated V for varying the energy applied to the field coil F in a direction inverse to the direction of variation of the energy generated by the movable coil M. More specifically, the control arrangement V includes a vacuum tube and circuits associated therewith so designed as to produce anode current variation in a direction opposite to the direction of the potential variation applied to the control electrode of the vacuum tube. This variation when properly adjusted as to degree results in automatic monitoring of the amplitude of the generated electrical wave relative to the mechanical vibration causing the same.

Considering the arrangement of Fig. 1 in greater detail, the translating device T is a phonograph pick-up having a movable armature coil 12 oscillated by a stylus 14 between the poles 16 of a field magnet, in conventional manner. The field magnet, however, instead of being a permanent magnet, is an electro-magnet energized by a field coil 18. The audio frequency alternating energy generated by armature coil 12 is fed by conductors 19 through a manually operable volume control unit 20 to a vacuum tube amplifier 22 and thence to a line 24 extending to utilization means as, for example, a loud speaker, or an additional amplifier followed by a loud speaker, or radio broadcasting apparatus. The volume control arrangement V is connected in shunt across the line 24 and includes a vacuum tube 26 having a grid or control electrode 28, a cathode or filament 30, and a plate or anode 32. The input or control electrode circuit is coupled to line 24, preferably through an audio frequency transformer 34. The control electrode circuit of the tube is provided with a grid condenser 36 and a grid leak resistor 38, somewhat analogous to the use of leaky grid condensers in radio frequency detector tubes, but, of course, the quantitative capacitance and resistance values are different.

The anode 32 is polarized from a source of direct anode potential connected to a lead 40, while the load impedance of the tube may be made up of the field coil 18 augmented, if desired, by an anode resistor 42. If the field coil 18 is wound with sufficient resistance, the auxiliary resistor 42 may, of course, be omitted.

In operation, an increase in potential of the generated wave causes an increase in the negative bias of the control electrode and consequently a decrease in the anode current of the tube. This reduces the energization or field strength of the pick-up and consequently reduces the output of the armature coil. The grid resistor 38 is preferably made variable, as by the use of a movable contact 44, and variation of the magnitude of the grid resistor adjusts the degree of control exercised by the vacuum tube on the anode current, and consequently the degree of volume control. It will be appreciated that the control exercised is not a simple limiting or cutting off of the high peaks, but rather is an at least approximately proportional reduction of the variations in amplitude which would otherwise be produced by the record.

To suppress the tendency for audio frequency pulsations to appear in the pick-up field coil, I employ coils 46 and 48 connected in the supply line 50 leading to the field coil, the coils 46 and 48 being wound in opposition so that they act not merely as choke coils but are tightly magnetically coupled through a single core 52 in such direction as to oppose audio frequency fluctuations in current. Because of this construction, the field coil 18 is, in effect, subjected to only the average or steady value of the anode current. It is, of course, possible to employ an appropriate filter system made up of chokes and bypass condensers designed to separate the anode current into its steady and alternating components, the steady component alone being supplied to the field coil. The arrangement here shown is, however, simple and inexpensive and in that respect preferable to the use of a filter system.

In an experimental set-up, the anode resistor 42 may be made variable, as shown, in order to make possible adjustment of the anode current of tube 26, and the circuit may be supplied with a milliammeter 54 for measurement of the anode current. It should be noted that variation of resistor 44 in varying the anode current also varies the absolute value or amplitude of the generated wave. This variation of volume may, of course, also be obtained by variation of the conventional volume control 20. In a commercial set-up the grid resistor 44 is preferably made variable, as shown, but the anode resistor 42 is of fixed value and may be and preferably is obtained by proper selection of the resistance of the coils 18, 46, and 48 any way needed in the circuit. The milliammeter 54 is, of course, omitted. The apparatus then includes only two controls: the volume control 20 for determining the volume level; and the grid resistor contact 44 for adjusting the degree of control exercised by the apparatus.

The invention is, of course, applicable to translating devices other than a phonograph pick-up. In Fig. 2, I illustrate the application of the invention to a dynamic microphone. The microphone includes a diaphragm 60 which imparts mechanical vibrations to a movable coil M located in the field of a field coil F. The field coil conductors 50' correspond to the conductors 50 shown in Fig. 1, while the movable coil conductors 19' correspond to the conductors 19 in Fig. 1. The remainder of the wiring diagram has not been illustrated in Fig. 2 because it corresponds to that shown in Fig. 1.

Solely by way of illustration of a particular example of my invention, and not in limitation thereof, I may refer to the application of the apparatus shown in Fig. 1 to the distribution of phonograph music over telephone lines to restaurants and similar establishments. For this purpose the line 24 may be considered as leading to the telephone line distribution system. The grid condenser 36 has a capacitance of ½ microfarad. The grid resistor 38 has a resistance of 1 megohm. The tube 26 is of the type numbered 48 and was selected as giving the desired anode current when polarized by a potential of 110 volts, this arrangement being preferred when the current supply available is direct rather than alternating. The anode circuit resistor 42 has a value of the order of 2500 ohms. The anode current fluctuates in a range of the order of 20 to 60 mills.

If desired, the chokes 46 and 48 may be supplemented by a large bypass condenser, such as the condenser 70, having a magnitude of, say, 12 microfarads.

Another optional feature is the use of a high resistance, 72, between the plate 32 and the filament 30, permitting the passage of a minimum flow of current regardless of the polarization of the grid 28. The resistance may be adjusted, in this particular case, to pass about 5 mills of current, when the grid is negatively biased to or beyond the cut-off potential. This provides a minimum field excitation regardless of the strength of the impressed signal, and so avoids distortion which may arise if the current through field coil 18 is brought down to zero.

It is believed that the mode of constructing and using as well as the many advantages of my improved sound translating circuit or audio frequency automatic volume control, will be apparent from the foregoing detailed description. The arrangement provides an automatic monitoring action which is vastly superior to anything obtainable by manual control, because the response is instantaneous. The variations in sound or mechanical vibration are reproduced with fidelity, and it is only the intensity or extent of the changes in volume that is diminished. No distortion is introduced, as when using a positive limit or cut-off at a predetermined volume level.

It will be apparent that while I have shown and described my invention in preferred forms, many changes and modifications may be made in the structures disclosed without departing from the spirit of the invention, defined in the following claims.

I claim:

1. Apparatus for the translation of mechanical vibrations into electrical waves, comprising a translating device including a field coil and a movable coil responsive to the mechanical vibrations, means to energize the field coil, and means for varying the energy applied to the field coil in a direction inverse to the direction of variation of the energy generated by the movable coil, in order to automatically monitor the amplitude of the electrical waves relative to the mechanical vibrations.

2. Apparatus for the translation of mechanical vibrations into electrical waves, comprising a translating device including a field coil and a movable coil responsive to the mechanical vibrations, means to energize the field coil means to vary the energy applied to the field coil in a direction inverse to the direction of variation of the energy generated by the movable coil, in order to automatically monitor the amplitude of the electrical waves, and means to adjust the degree of energy variation or monitor control produced by the apparatus.

3. Apparatus for the translation of mechanical vibrations into electrical waves, comprising a translating device including a field coil and a movable coil responsive to the mechanical vibrations, means to so rectify a portion of the energy generated by the movable coil as to obtain an average value inversely indicative of the generated wave amplitude, and means to vary the energy applied to the field coil in accordance with the said average value, in order to automatically monitor the amplitude of the electrical relative to the mechanical vibrations.

4. Apparatus for translating mechanical vibrations into electrical waves, comprising a translating device including a field coil and a movable coil responsive to the mechanical vibrations, a vacuum tube, circuits associated therewith to produce anode current variation in a direction opposite to the direction of the potential variation applied to the control electrode, means coupling the input circuit of the vacuum tube in shunt to the output circuit of the movable coil, and means for feeding the steady component of the anode current of the vacuum tube through the field coil of the translating device.

5. Phonograph apparatus for translating sound waves into electrical waves, comprising a phonograph pickup including a field coil and a movable armature coil responsive to the sound groove on a record, a vacuum tube, circuits associated therewith to produce anode current variation in a direction opposite to the direction of the potential variation applied to the control electrode, means coupling the input circuit of the vacuum tube in shunt to the output circuit of the armature coil, means feeding the anode current of the vacuum tube to the field coil of the pickup, and means to prevent pulsation at audio frequency of the current supplied to the field coil.

6. Apparatus for translating mechanical vibrations into electrical waves and for automatically monitoring the amplitude of the electrical waves, said apparatus comprising a translating device including a field coil and a movable coil, a vacuum tube, an input circuit therefor including a grid leak resistor and a condenser, means coupling the movable coil to said input circuit, and an output circuit for said vacuum tube connected to the field coil for energizing the same.

7. Apparatus for translating mechanical vibrations into electrical waves and for automatically monitoring the amplitude of the electrical waves, said apparatus comprising a translating device including a field coil and a movable coil, a vacuum tube, an input circuit therefor including a grid leak resistor and a condenser, means coupling the movable coil to said input circuit, an output circuit for said vacuum tube connected to the field coil for energizing the same, and means to minimize pulsation at audio frequency of the energy supplied to the field coil.

8. Apparatus for translating mechanical vibrations into electrical waves and for automatically monitoring the amplitude of the electrical waves, said apparatus comprising a translating device including a field coil and a movable coil, a vacuum tube, an input circuit therefor including a grid leak resistor and a condenser, means coupling the movable coil to said input circuit, an output circuit for said vacuum tube connected to the field coil for energizing the same, and means to suppress the audio frequency component of the energy supplied to the field coil, said means including coils in the field coil supply and return conductors closely magnetically coupled in opposition.

9. Apparatus for translating mechanical vibrations into electrical waves and for automatically monitoring the amplitude of the electrical waves, said apparatus comprising a translating device including a field coil and a movable coil, a vacuum tube, an input circuit therefor including a grid leak resistor and a condenser, means coupling the movable coil to said input circuit, an output circuit for said vacuum tube connected to the field coil for energizing the same, means to prevent pulsation at audio frequency of the energy applied to the field coil, and means to vary the degree of control exercised by the apparatus by varying the resistance value of the aforesaid grid resistor.

10. Phonograph apparatus for translating mechanical vibrations into electrical waves and for automatically monitoring the amplitude of the electrical waves, said apparatus comprising a pickup including a field coil and a movable armature coil, a vacuum tube, an input circuit therefor including a grid leak resistor and a condenser, means coupling the armature coil to said input circuit, an output circuit for said vacuum tube connected to the field coil for energizing the same, and means to eliminate audio frequency pulsation of the energy applied to the field coil.

11. In the translation of mechanical vibrations into electrical waves by means of a translating device including a field coil and a movable coil responsive to the mechanical vibrations, the method of automatically monitoring or controlling the amplitude of the electrical waves relative to the mechanical vibrations, which includes varying the energy applied to the field coil in a direction inverse to the direction of variation of the energy generated by the movable coil.

12. In the translation of mechanical vibrations into electrical waves by means of a translating device including a field coil and a movable coil responsive to the mechanical vibrations, the method of automatically monitoring or controlling the amplitude of the electrical waves, which includes so rectifying a portion of the energy generated by the movable coil as to obtain an average value inversely indicative of the generated wave amplitude, and varying the energy applied to the field coil in accordance with the said averaged value.

13. In the translation of mechanical vibrations into electrical waves by means of a vacuum tube circuit and a translating device including a field coil and a movable coil responsive to the mechanical vibrations, the method of automatically monitoring or controlling the amplitude of the electrical waves, which includes applying a portion of the energy generated by the movable coil to the control electrode circuit of the vacuum tube, so operating said vacuum tube as to produce anode current variation in a direction opposite to the direction of the potential variation applied to the control electrode, and energizing the field coil of the translating device by means of the steady component of the anode current of the vacuum tube.

14. In the translation of mechanical vibrations into electrical waves by means of a vacuum tube circuit and a translating device including a field coil and a movable coil responsive to the mechanical vibrations, the method of automatically monitoring or controlling the amplitude of the electrical waves, which includes applying a portion of the energy generated by the movable coil to the control electrode circuit of the vacuum tube, so operating said vacuum tube as to produce anode current variation in a direction opposite to the direction of the potential variation applied to the control electrode, energizing the field coil of the translating device by means of the anode current of the vacuum tube, and suppressing pulsation at audio frequency of the current supplied to the field coil.

ROBERT W. MILLER.